US012755482B2

(12) United States Patent
Rao

(10) Patent No.: US 12,755,482 B2
(45) Date of Patent: Oct. 6, 2026

(54) VIRTUAL SHADOWING WITH DIMMING MAP

(71) Applicant: Meta Platforms Technologies, LLC, Menlo Park, CA (US)

(72) Inventor: Zhiqing Rao, Redmond, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 106 days.

(21) Appl. No.: 18/760,415

(22) Filed: Jul. 1, 2024

(65) Prior Publication Data

US 2026/0004512 A1 Jan. 1, 2026

(51) Int. Cl.

*G06T 15/60* (2006.01)
*G02B 27/01* (2006.01)
*G06T 5/70* (2024.01)
*G09G 3/00* (2006.01)

(52) U.S. Cl.

CPC .......... *G06T 15/60* (2013.01); *G02B 27/0172* (2013.01); *G06T 5/70* (2024.01); *G09G 3/001* (2013.01); *G02B 2027/0178* (2013.01); *G06T 2215/12* (2013.01); *G09G 2320/0686* (2013.01)

(58) Field of Classification Search

None
See application file for complete search history.

(56) References Cited

U.S. PATENT DOCUMENTS

| | | | | |
|---|---|---|---|---|
| 9,652,892 | B2 * | 5/2017 | Tomlin | G06T 19/006 |
| 10,083,540 | B2 * | 9/2018 | Sugden | G06T 7/11 |
| 10,210,670 | B2 * | 2/2019 | Yamazaki | G09G 3/002 |
| 10,255,717 | B2 * | 4/2019 | Bogomjakov | G06T 1/20 |
| 10,573,067 | B1 * | 2/2020 | Naik | G06T 19/20 |
| 11,164,359 | B2 * | 11/2021 | Gruen | G06T 15/06 |
| 11,367,250 | B2 * | 6/2022 | Totty | G06T 15/205 |
| 2015/0116354 | A1 * | 4/2015 | Tomlin | G02B 27/017 345/633 |
| 2018/0122132 | A1 * | 5/2018 | Bogomjakov | G06T 1/20 |
| 2021/0241676 | A1 * | 8/2021 | Hazra | G09G 5/10 |

* cited by examiner

*Primary Examiner* — Talha M Nawaz
(74) *Attorney, Agent, or Firm* — Greenberg Traurig, LLP

(57) ABSTRACT

A dimming map is generated that includes a virtual shadow of a virtual object. The dimming map is generated based on a location of a light source or measuring an ambient light condition of a head-mounted display (HMD). The dimming map is driven onto a dimming optical element of the HMD to present the virtual shadow of the virtual object onto the real-world object.

18 Claims, 17 Drawing Sheets

VIRTUAL SHADOW CASTING

VIRTUAL SHADOWING WITH DIMMING MAP

TECHNICAL FIELD

This disclosure relates generally to head-mounted displays, and in particular to virtual shadowing.

BACKGROUND INFORMATION

In augmented reality scenes, realistic virtual shadows increase the quality of the scene. A user may expect a virtual object to cast a shadow in a scene so that the virtual object is integrated into the scene in a believable way. For example, if the sun is setting, a virtual tree in the scene would be expected to generate a shadow in the augmented reality scene.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Figure 1A:
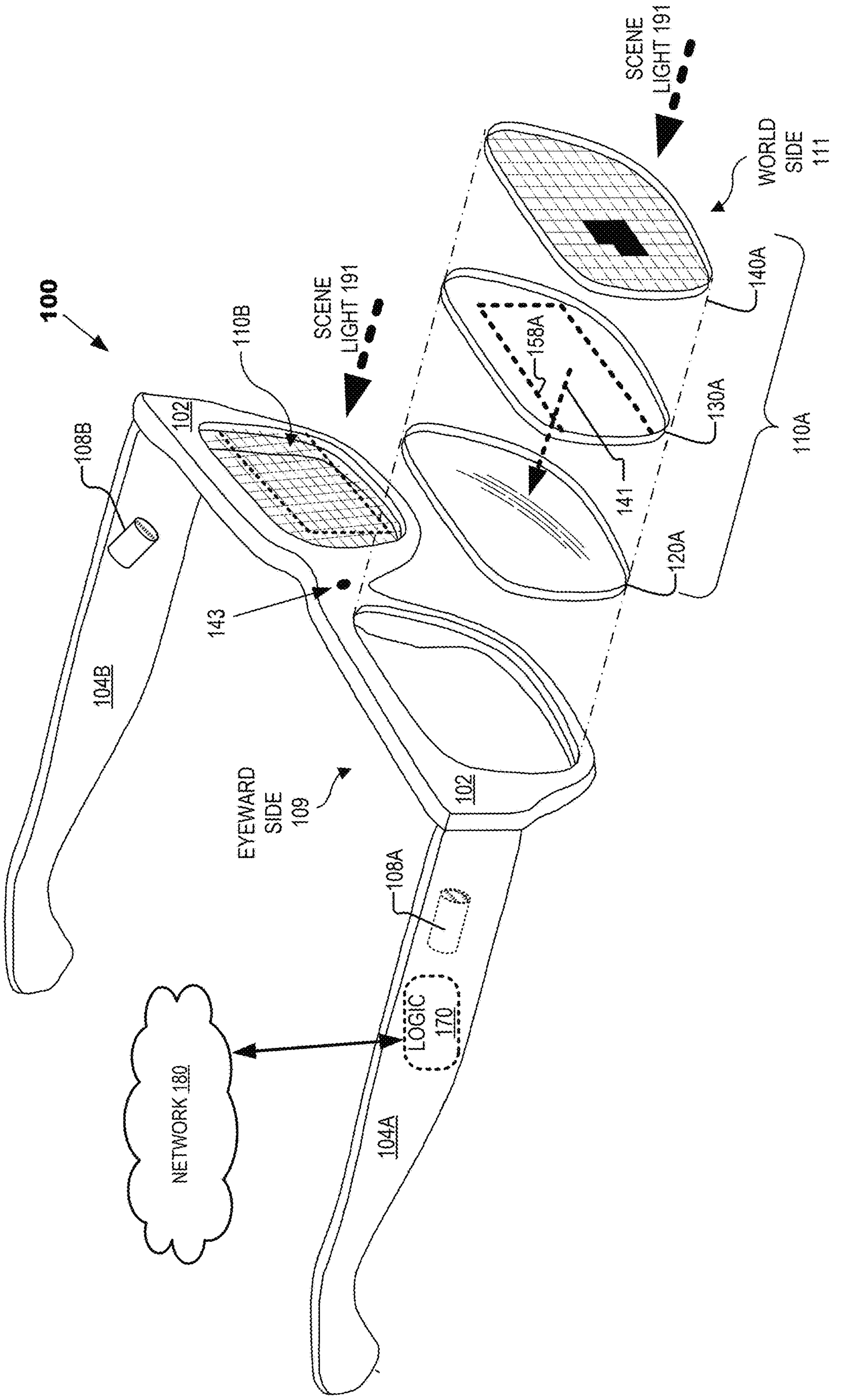
FIG. 1A illustrates an example head-mounted display (HMD) including a dimming optical element for presenting a virtual shadow, in accordance with aspects of the disclosure.

Embodiments of virtual shadowing are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In some implementations of the disclosure, the term "near-eye" may be defined as including an element that is configured to be placed within 50 mm of an eye of a user while a near-eye device is being utilized. Therefore, a "near-eye optical element" or a "near-eye system" would include one or more elements configured to be placed within 50 mm of the eye of the user.

In aspects of this disclosure, visible light may be defined as having a wavelength range of approximately 380 nm-700 nm. Non-visible light may be defined as light having wavelengths that are outside the visible light range, such as ultraviolet light and infrared light. Infrared light having a wavelength range of approximately 700 nm-1 mm includes near-infrared light. In aspects of this disclosure, near-infrared light may be defined as having a wavelength range of approximately 700 nm-1.6 μm.

In aspects of this disclosure, the term "transparent" may be defined as having greater than 90% transmission of light. In some aspects, the term "transparent" may be defined as a material having greater than 90% transmission of visible light.

Current techniques struggle with generating realistic virtual shadows in Augmented Reality (AR) contexts. Displays used in AR contexts are often additive displays (adding display light to real-world scene light) and simply subtracting light from the additive display does not necessarily generate the darkness required for a convincing virtual shadow. One existing technique renders the desired shadow region with low brightness, but the area surrounding the shadow region is rendered with high brightness in attempt to establish contrast. However, this technique draws increased electrical power and it makes the shadow and shadow surrounding regions appear less realistic and difficult to view.

In implementations of the disclosure, a virtual shadow is provided by driving a dimming map onto a dimming optical element of a head-mounted display (HMD). The dimming optical element modulates (e.g. by subtraction) the intensity of light in certain portions of the dimming optical element in order to generate the virtual shadow. In an implementation, a real-world object (in an external environment) is identified. The real-world object may be a table, a floor, a wall, etc. A light sensor (e.g. photodiode, camera) may detect ambient light conditions of the external environment. In an example, the location and intensity of one or more light sources in the external environment are determined. Based on the ambient light conditions, a dimming map including a virtual shadow may be generated. The dimming map may be driven onto the dimming element of a head-mounted display to present the virtual shadow of the virtual object onto a real-world object. The dimming optical element may include a plurality of dimming pixels that can be modulated by the dimming map in order to provide a shape of the virtual shadow and darkness values of the virtual shadow. These and other embodiments are described in more detail in connection with FIGS. 1-16.

FIG. 1A illustrates an example head-mounted display (HMD) 100 including a dimming optical element 140 for presenting a virtual shadow, in accordance with aspects of the present disclosure. The illustrated example of HMD 100 is shown as including a frame 102, temple arms 104A and 104B, and near-eye optical elements 110A and 110B. Cameras 108A and 108B are shown as coupled to temple arms 104A and 104B, respectively. Cameras 108A and 108B may be configured to image an eyebox region to image the eye of the user to capture eye data of the user.

Cameras 108A and 108B may image the eyebox region directly or indirectly. For example, optical elements 110A and/or 110B may have an optical combiner that is configured to redirect light from the eyebox to the cameras 108A and/or 108B. In some implementations, near-infrared light sources (e.g. LEDs or vertical-cavity side emitting lasers) illuminate the eyebox region with near-infrared illumination light, and cameras 108A and/or 108B are configured to capture infrared images. Cameras 108A and/or 108B may include complementary metal-oxide semiconductor (CMOS) image sensors. A near-infrared filter that receives a narrow-band near-infrared wavelength may be placed over the image sensor so that the image sensor is sensitive to the narrow-band near-infrared wavelength while rejecting visible light and wavelengths outside the narrow-band. The near-infrared light sources may emit the narrow-band wavelength that is passed by the near-infrared filters.

Light sensor 143 is positioned on frame 102 and is configured to detect ambient light conditions of the external environment of HMD 100. Light sensor 143 may be include a photodiode or a CMOS image sensor. A Simultaneous Localization and Mapping (SLAM) camera may be used as light sensor 143, in some implementations. While FIG. 1A only shows a single light sensor 143 that is positioned near the middle of the front face of frame 102, it is understood that the depiction in FIG. 1A is merely an example. Singular or multiple light sensors 143 may be located at frame 102 near the other temple arm 104B, at other locations on frame 102, at either or both temple arms 104A and 104B, near or within either or both optical elements 110A and 110B, or elsewhere.

HMD 100 includes processing logic 170. Processing logic 170 may be communicatively coupled to a network 180. Processing logic 170 may be communicatively coupled to network 180 via wired or wireless connection. Processing logic 170 may transmit and/or receive data from network 180. Network 180 may include a local device or remote computing (e.g. a data center).

As shown in FIG. 1A, frame 102 is coupled to temple arms 104A and 104B for securing the HMD 100 to the head of a user. Example HMD 100 may also include supporting hardware incorporated into the frame 102 and/or temple arms 104A and 104B. The hardware of HMD 100 may include any of processing logic (e.g. processing logic 170), wired and/or wireless data interface for sending and receiving data, graphic processors, and one or more memories for storing data and computer-executable instructions. In one example, HMD 100 may be configured to receive wired power and/or may be configured to be powered by one or more batteries. In addition, HMD 100 may be configured to receive wired and/or wireless data including video data.

FIG. 1A also illustrates an exploded view of an example of near-eye optical element 110A. Near-eye optical element 110B may be configured similarly to near-eye optical element 110A. Near-eye optical element 110A is shown as including an optically transparent layer 120A, a display layer 130A, and a dimming optical element 140A. Display layer 130A may include a waveguide 158A that is configured to direct virtual images included in visible image light 141 to an eye of a user of HMD 100 that is in an eyebox region of HMD 100. In some implementations, at least a portion of the electronic display of display layer 130A is included in frame 102 of HMD 100. The electronic display may include an LCD, an organic light emitting diode (OLED) display, micro-LED display, pico-projector, or liquid crystal on silicon (LCOS) display for generating the image light 141.

FIG. 1A illustrates near-eye optical elements 110A and 110B that are configured to be mounted to the frame 102. In some examples, near-eye optical elements 110A and 110B may appear transparent or semi-transparent to the user to facilitate augmented reality such that the user can view visible scene light 191 from the environment while also receiving image light 141 directed to their eye(s) by way of display layer 130A.

Optically transparent layer 120A is shown as being disposed between display layer 130A and the eyeward side 109 of the near-eye optical element 110A. As mentioned above, the optically transparent layer 120A may also be transparent to visible light, such as scene light 191 received from the external environment and/or image light 141 received from the display layer 130A. In some examples, the optically transparent layer 120A has a curvature for focusing light (e.g., image light and/or scene light) to the eye of the user. Thus, the optically transparent layer 120A may, in some examples, may be referred to as a lens. In some aspects, the optically transparent layer 120A has a thickness and/or curvature that corresponds to the specifications of a user. In other words, the optically transparent layer 120A may be a prescription lens. However, in other examples, the optically transparent layer 120A may be a non-prescription lens. In some implementations, optically transparent layer 120 is omitted from near-eye optical element 110A.

Dimming optical element 140A may be superimposed over display layer 130A at a world side 111 of near-eye optical element 110A, such that dimming optical element 140A is facing a scene that is being viewed by the user in the field of view (FOV) of the user of HMD 100. According to various embodiments, dimming optical element 140A may include an array of dimming pixels configured to selectively modulate an intensity of scene light 191 propagating to the eyebox region. In some implementations, the dimming pixels are arranged in rows and columns.

In some implementations, the dimming pixels are configured to be driven ON (passing the lowest amount of light) or OFF (passing the highest amount of light) according to a digital dimming map. In other implementations, the dimming pixels may be modulated with more granular control where the dimming pixels can be driven in a more analog manner to pass a certain percentage of scene light. For example, the dimming pixels may be driven to pass approximately 0% of scene light (or darkest possible), 10% of scene light, 20% of scene light, 30% of scene light, 40% of scene light, 50% of scene light, 60% of scene light, 70% of scene light, 80% of scene light, 90% of scene light, and approximately 100% of scene light (or as transmissive as possible). In some implementations, the more granular control of the transmission of scene light 191 is achieved by time-modulating digital dimming pixels at a frequency high enough that the time-switching is not perceived by the eye of a user. The dimming pixel array of dimming optical element 140A may have a lower resolution than the images included in image light 141. In some implementations, the dimming pixel array of dimming optical element 140 may have a same or similar resolution as images included in image light 141.

Those skilled in the art understand that near-eye optical element 110A may include different arrangements of the layers (e.g. layers 120A, 130A, and/or 140A) additions of layers including intervening layers, or even deletion of some layers. In an implementation, an eye-tracking layer may be added to near-eye optical element 110A.

While FIG. 1A illustrates an HMD 100 configured for augmented reality (AR), the disclosed implementations may also be used in other implementations of a head mounted display such as in a mixed reality (MR) context of a virtual reality head mounted display where images from the real-world scene are passed through to a display of the HMD.

Figure 1B:
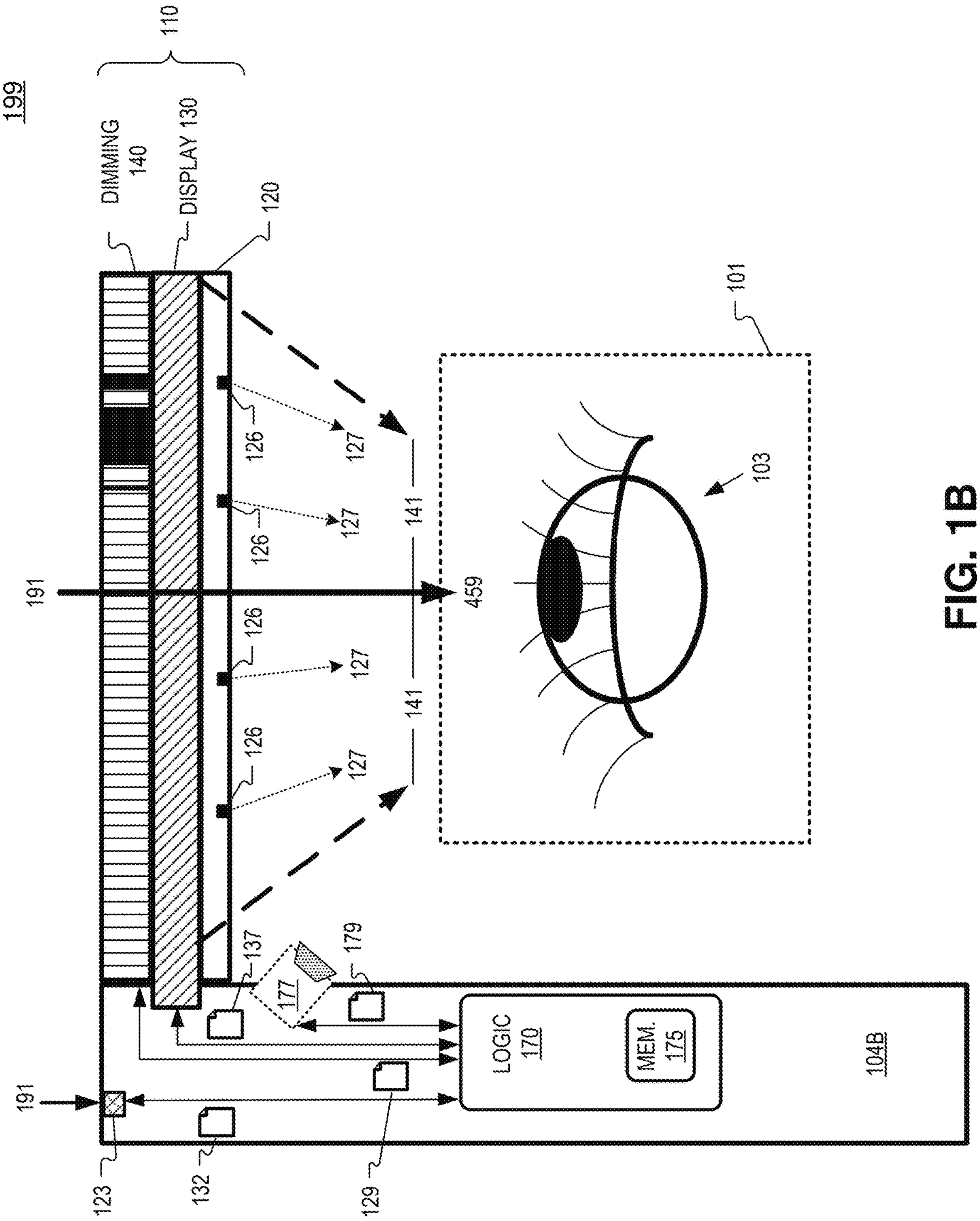
FIG. 1B illustrates a top view of a portion of an example HMD that includes a dimming optical element for generating a virtual shadow, in accordance with aspects of the disclosure.

FIG. 1B illustrates a top view of a portion of an example HMD 199 that includes a dimming optical element 140 for generating a virtual shadow, in accordance with implementations of the disclosure. HMD 199 may have some similar features as HMD 100 of FIG. 1A, with further details now being provided for at least some of the same or similar elements as HMD 100.

HMD 199 may include an optical element 110 that includes a dimming optical element 140, display layer 130, and layer 120. Dimming optical element 140 may be used for dimming optical element 140A, display layer 130 may be used as display layer 130, and layer 120 may be used as layer 120A, for example. Additional optical layers (not specifically illustrated) may also be included in example optical element 110.

Display layer 130 presents virtual images in image light 141 to an eyebox region 101 for viewing by an eye 103. Processing logic 170 is configured to drive virtual images 137 onto display layer 130 to present image light 141 to eyebox region 101. All or a portion of display layer 130 may be transparent or semi-transparent to allow scene light 191 from an external environment to become incident on eye 103 so that a user can view their external environment in addition to viewing virtual images presented in image light 141.

Processing logic 170 may be configured to drive a dimming map 129 onto dimming pixels of dimming optical element 140 to modulate the transparency of the dimming pixels. The dimming map may have digital (ON/OFF) dimming values or analog dimming values for more granular control of the transparency of the dimming pixels. In an example implementation, the dimming pixels include liquid crystals where the alignment of the liquid crystals is adjusted in response to the dimming map 129 driven onto the dimming optical element 140 by processing logic 170 to modulate the transparency of the dimming pixels. Other suitable technologies that allow for electronically and/or optically controlled dimming of the dimming element may be included in dimming optical element 140. Example technologies may include, but are not limited to, electrically activated guest host liquid crystal technology in which a guest host liquid crystal coating is present on a lens surface, photochromic dye technology in which photochromic dye embedded within a lens is activated by ultraviolet (UV) or blue light, or other dimming technologies that enable controlled dimming of pixels through electrical, optical, mechanical, and/or other activation techniques.

In the example of FIG. 1B, layer 120 includes light sources 126 configured to illuminate an eyebox region 101 with infrared illumination light 127. Layer 120 may include a transparent refractive material that functions as a substrate for light sources 126. Infrared illumination light 127 may be near-infrared illumination light. Camera 177 is configured to image (directly) eye 103, in the illustrated example of FIG. 1B. In other implementations, camera 177 may (indirectly) image eye 103 by receiving reflected infrared illumination light from an optical combiner layer (not illustrated) included in optical element 110. The optical combiner layer may be configured to receive reflected infrared illumination light (the infrared illumination light 127 reflected from eyebox region 101) and redirect the reflected infrared illumination light to camera 177. In this implementation, camera 177 would be oriented to receive the reflected infrared illumination light from the optical combiner layer of optical element 110.

Camera 177 may include a complementary metal-oxide semiconductor (CMOS) image sensor, in some implementations. An infrared filter that receives a narrow-band infrared wavelength may be placed over the image sensor so that it is sensitive to the narrow-band infrared wavelength while rejecting visible light and wavelengths outside the narrow-band. Infrared light sources (e.g. light sources 126) such as infrared LEDs or infrared VCSELS that emit the narrow-band wavelength may be oriented to illuminate eye 103 with the narrow-band infrared wavelength. Camera 177 may capture eye-tracking images of eyebox region 101. Eyebox region 101 may include eye 103 as well as surrounding features in an ocular area such as eyebrows, eyelids, eye lines, etc. Processing logic 170 may initiate one or more image captures with camera 177 and camera 177 may provide eye-tracking images 179 to processing logic 170.

In the illustrated implementation of FIG. 1B, a memory 175 is included in processing logic 170. In other implementations, memory 175 may be external to processing logic 170. In some implementations, memory 175 is located remotely from processing logic 170. In implementations, virtual image(s) 137 are provided to processing logic 170 for presentation in image light 141. In some implementations, virtual images are stored in memory 175. Processing logic 170 may be configured to receive virtual images from a local memory or the virtual images may be wirelessly transmitted to the HMD 199 and received by a wireless interface (not illustrated) of the head mounted device.

FIG. 1B illustrates that processing logic 170 is communicatively coupled to light sensor 123. Processing logic 170 may be communicatively coupled to a plurality of light sensors, in some implementations. Light sensor 123 may be include a photodiode, plurality of photodiodes, ambient light sensor (ALS), image sensor, and/or a SLAM camera. In the illustrated implementation, processing logic 170 is configured to receive ambient light condition measurement 132 from light sensor 123. Light sensor 123 receives scene light 191 to generate the ambient light condition measurement 132. Processing logic 170 may also be communicatively coupled to light sensor 123 to initiate the ambient light condition measurement 132. The ambient light condition measurement 132 may be an image, in some implementation.

Figure 2:
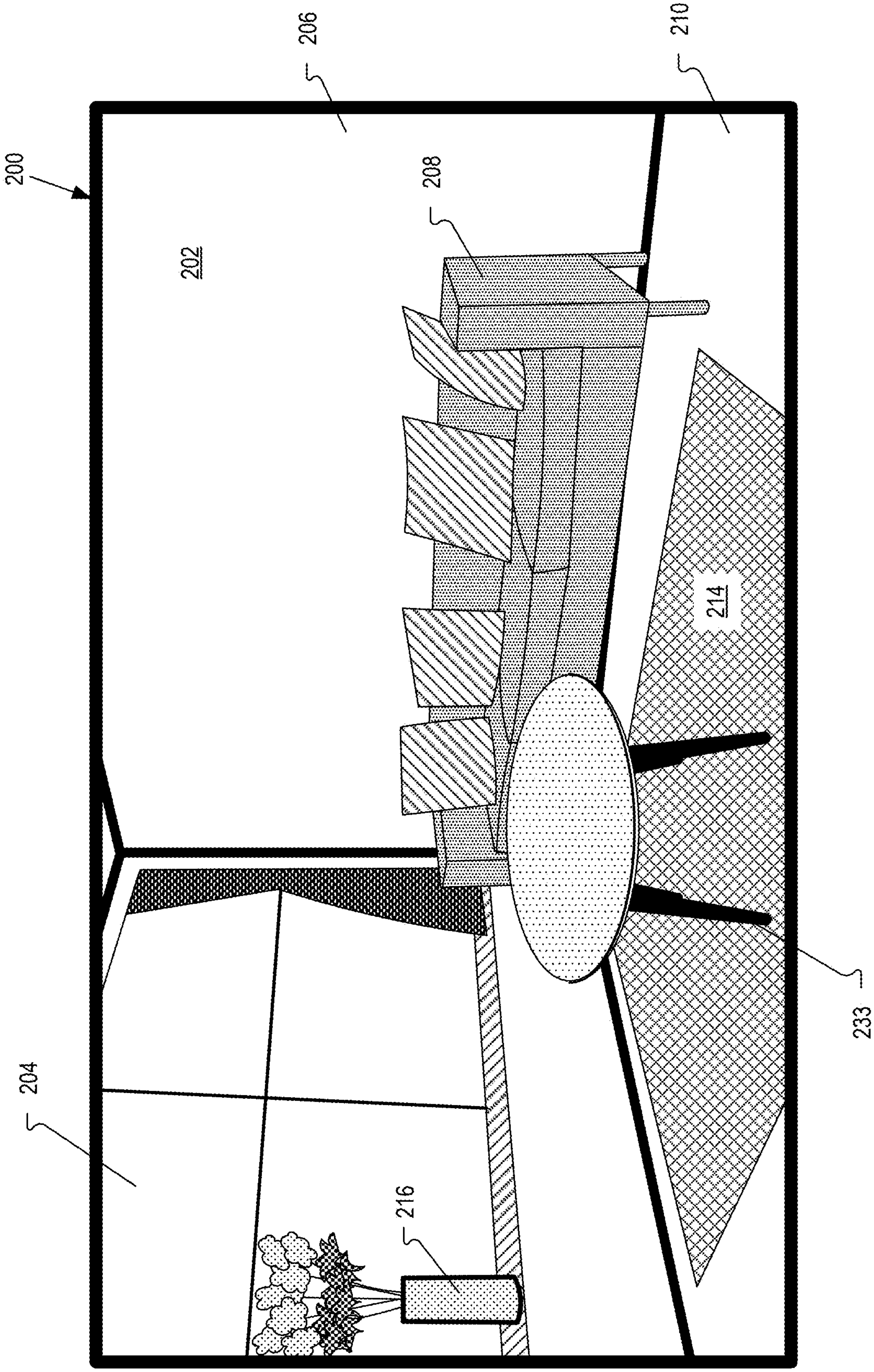
FIG. 2 shows an example field of view (FOV) of a user of an HMD, in accordance with aspects of the disclosure.

FIG. 2 shows an example FOV 200 of a user of HMD 100, in accordance with aspects of the disclosure. The user of HMD 100/199 is viewing a scene 202 in FOV 200, which in this example is a living room. The living room includes a window 204 having a vase 216 full of flowers sitting on the windowsill. The living room includes a wall 206, couch 208 (including striped throw pillows) and a floor 210. A table 233 having four legs and a round table-top stands on a rug 213 laying on floor 210 in front of couch 208. Ambient light in the living room illuminates scene 202 and is transmitted as scene light 191 to an eye of a user of HMD 100.

Figure 3:
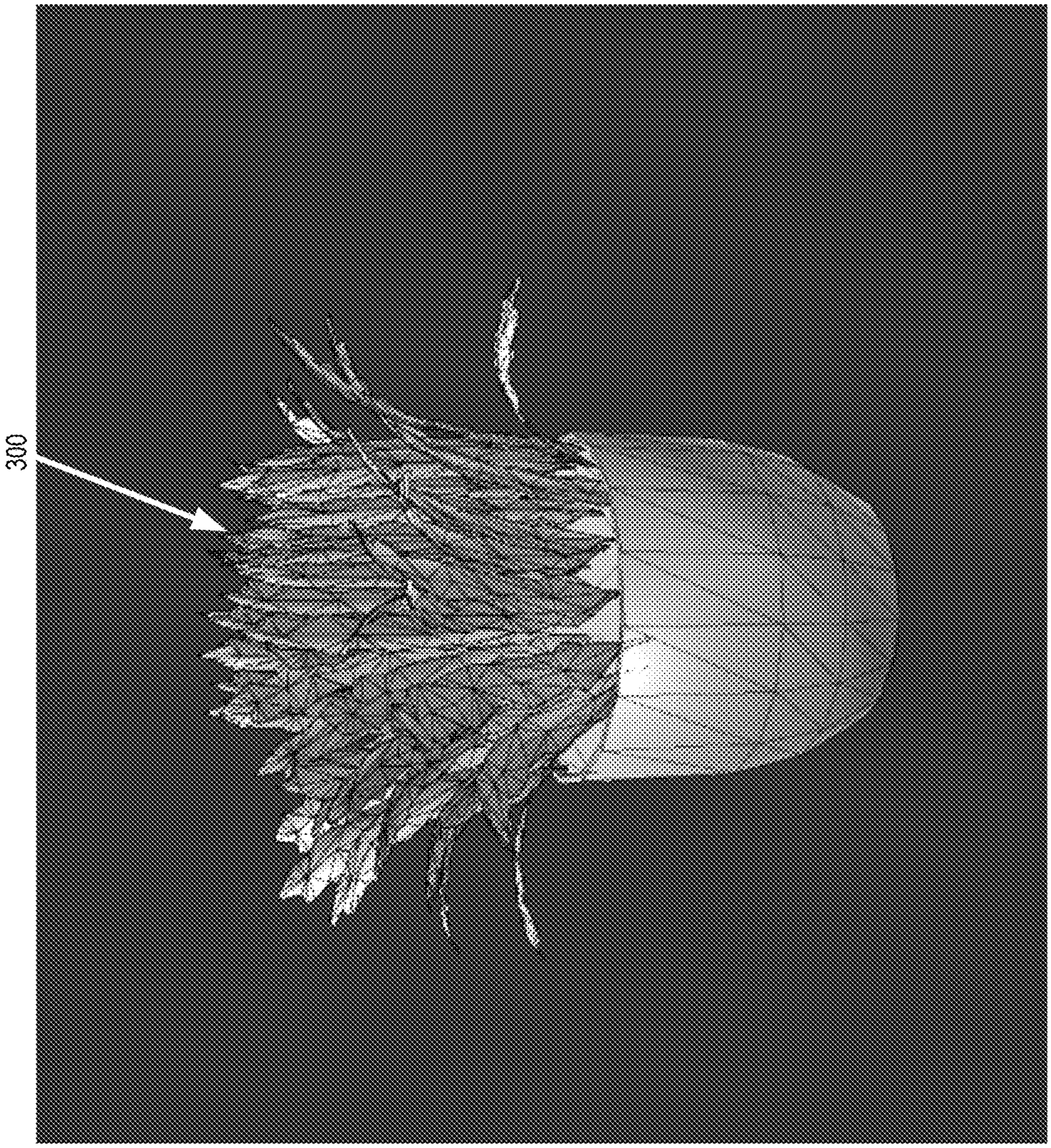
FIG. 3 illustrates an example virtual object, in accordance with aspects of the disclosure.

FIG. 3 illustrates an example of a virtual object 300, in accordance with aspects of the disclosure. In the context of this disclosure, "virtual object" will be defined to include both virtual non-living objects (e.g. a book or a monitor) that are inanimate and virtual living plants/animals/humans that may be included in virtual images. In FIG. 3, the virtual object 300 is a plant that includes both living plant matter and an inanimate pot that the plant is planted in. Virtual object 300 may also be referred to as plant 300 in this disclosure.

Implementations of the disclosure include presenting virtual shadows for virtual objects (e.g. plant 300) cast on real-world objects (e.g. table 233). This is merely an example, and other virtual objects (e.g. a computer monitor) may also utilize virtual shadows being cast on real-world objects (e.g. a desk).

Figure 15:
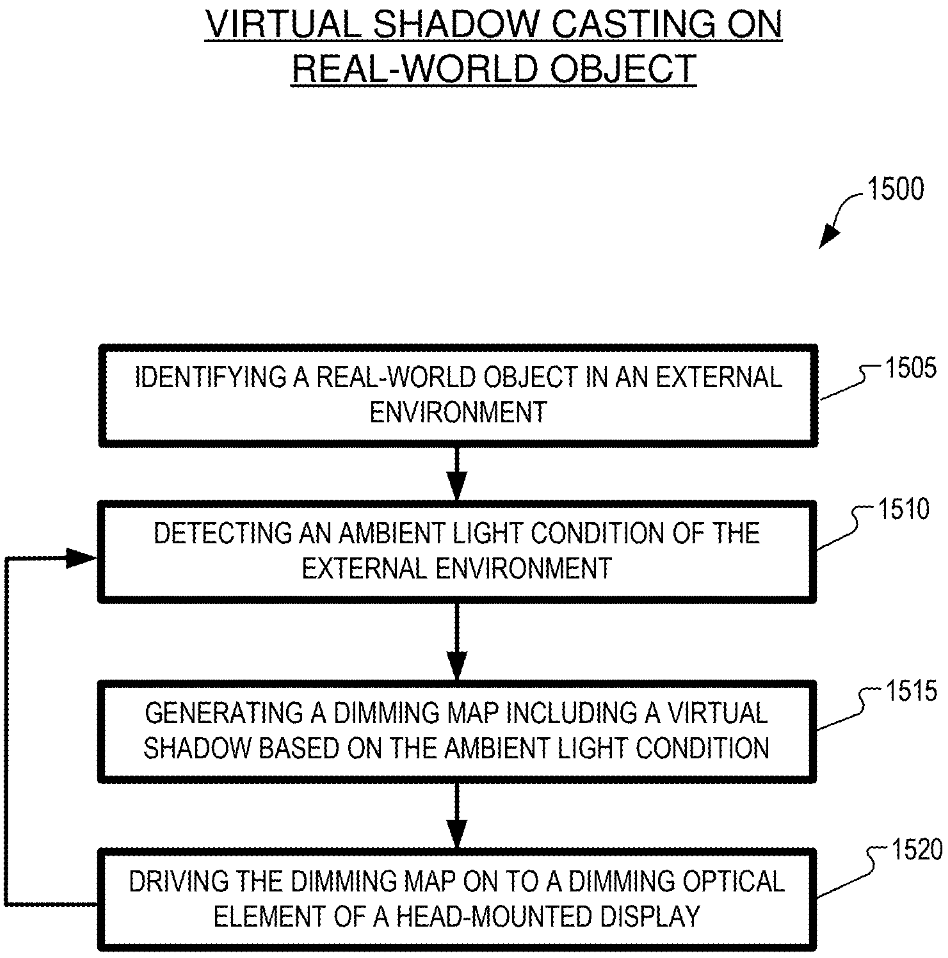
FIG. 15 illustrates an example flow chart of a process for generating a virtual shadow cast on a real-world object, in accordance with aspects of the disclosure.

FIG. 15 illustrates an example flow chart of a process 1500 for generating a virtual shadow cast on a real-world object, in accordance with aspects of the disclosure. The order in which some or all of the process blocks appear in process 1500 should not be deemed limiting. Rather, one of ordinary skill in the art having the benefit of the present disclosure will understand that some of the process blocks may be executed in a variety of orders not illustrated, or even in parallel. In some implementations of process 1500, processing logic 170 may perform all or a portion of the process blocks included in process 1500.

In process block 1505, a real-world object (e.g. table 233) is identified in an external environment (e.g. scene 202).

In process block 1510, an ambient light condition of the external environment is detected. In an implementation, detecting the ambient light condition includes detecting one or more light sources in the external environment and a location of the one or more light sources. Detecting the ambient light condition may include detecting a color of the one or more light source and/or an intensity of the one or more light sources. The light sources may include the sun or light from light bulbs, for example. In an implementation, detecting the ambient light condition includes receiving ambient light sensor data, simultaneous localization and mapping (SLAM) images, or color images from a Point-of-View (POV) camera of the head-mounted display.

In process block 1515, a dimming map including a virtual shadow is generated based on the ambient light condition. In some implementations, the virtual shadow is cast by a virtual object on the real-world object.

In process block 1520, the dimming map is driven onto a dimming optical element (e.g. dimming optical element 140A) of an HMD to present the virtual shadow of the virtual object onto the real-world object. In some implementations, the dimming optical element includes an array of dimming pixels that modulate an intensity of the scene light 191 from the external environment through the dimming optical element.

In some implementations, process 1500 returns to process block 1510 after executing process block 1520.

In an implementation, process 1500 further includes driving the virtual object onto a display of the head-mounted display contemporaneously with driving the diming map onto the dimming optical element. In this disclosure, "contemporaneously" includes contexts where the virtual shadow is driven onto the dimming optical element within 50 ms of the virtual object being driven onto the display. This allows a user of the HMD to view/perceive the virtual object and the virtual shadow together.

In an implementation of process 1500, identifying the real-world object in the external environment may include building a scene mesh including a plurality of objects of the external environment, as is known by those skilled in the art. Building a scene mesh may include building a model of objects in a scene and their locations to one another and their depths with respect to a HMD. For example, in scene 202, the scene mesh may include models of the table 233, couch 208, wall 206, floor 210, and window 204. After a scene mesh of the objects in the external environment is built/generated, one (or more) of the real-world objects may be selected from the plurality of objects in the scene mesh based on a location of the real-world object with respect to the virtual object.

Figure 4:
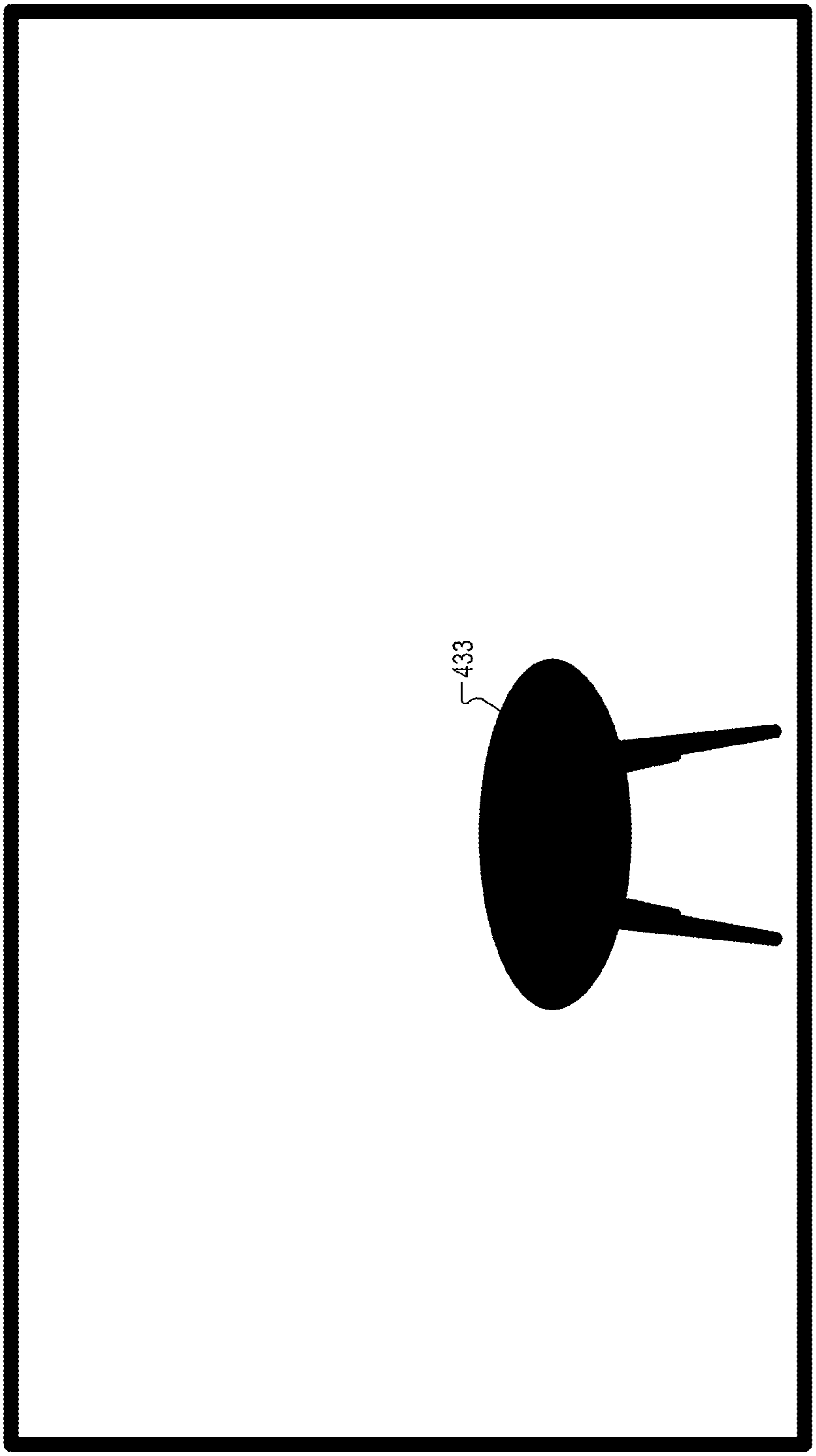
FIG. 4 illustrates a real-world object depth map that has been selected from a scene mesh of a scene, in accordance with aspects of the disclosure.

FIG. 4 illustrates a real-world object depth map 433 that has been selected from a scene mesh of scene 202. In some implementations, more than one real-world object will be selected to be included in the real-world object depth map 433. The real-world object depth map 433 may include the different depths of the various real-world objects that will have virtual shadows cast on them. The real-world object depth map 433 may be generated by performing occlusion analysis of the real-world objects in a scene mesh with respect to a virtual object and light from a light source.

Figure 5:
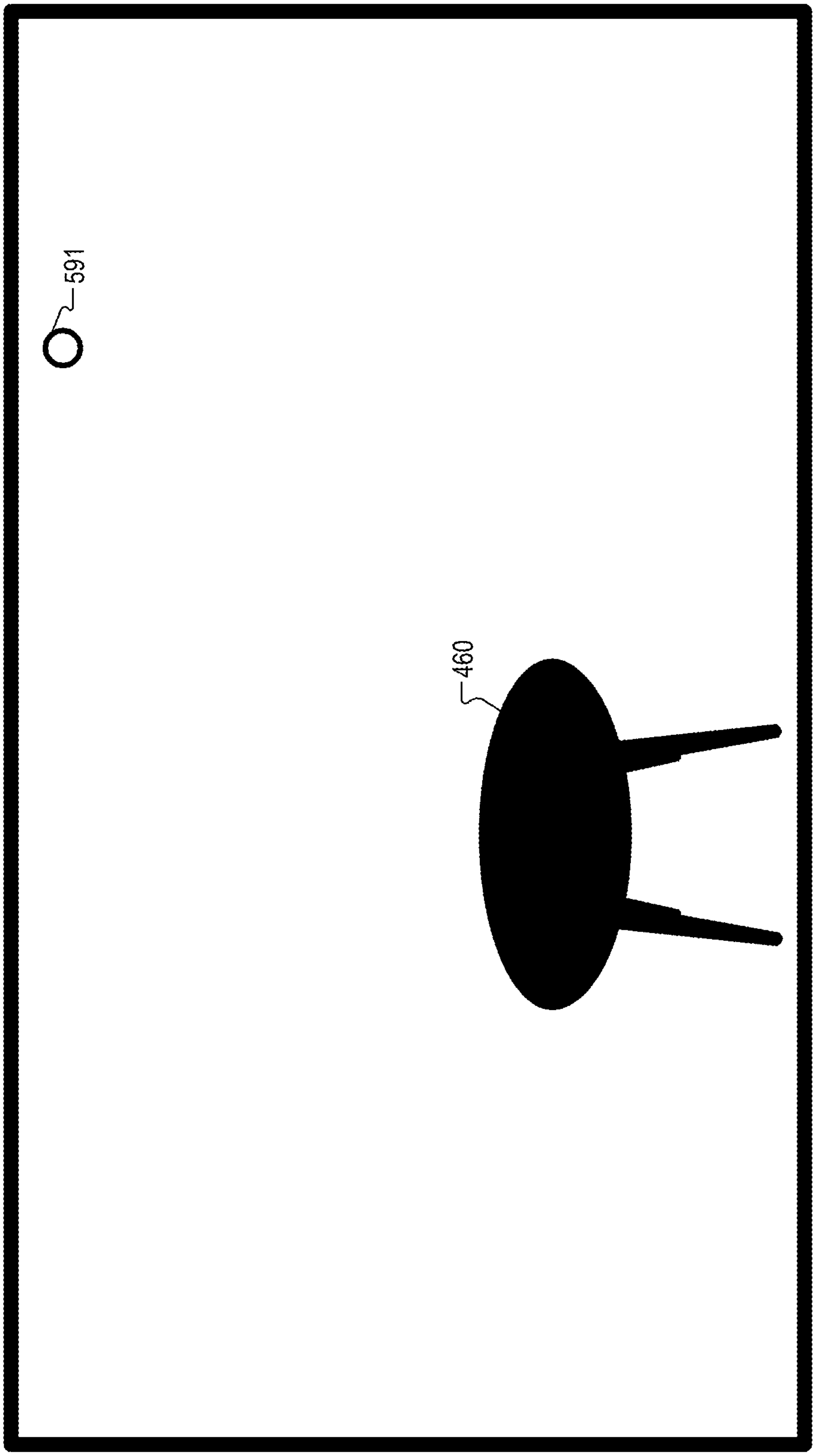
FIG. 5 illustrates a real-world object map and a light source detected in the ambient light condition received by the light sensor, in accordance with aspects of the disclosure.

FIG. 5 illustrates the real-world object depth map 433 and a light source 591 detected in the ambient light condition received by the light sensor. The attributes of the light source such as the location of light source 591, the intensity of the light from the light source 591, and/or the color of the light source may be detected from the ambient light condition.

In an implementation, an ambient light sensor is used to detect and estimate a global environment brightness of the scene. This may run at high frames-per-second that is still lower than the display frames-per-second. In an implementation, one or more SLAM cameras are used to get region-based brightness information (or even per-pixel based brightness information). The SLAM pixels of SLAM images may be re-used. In an implementation, a Point of View (POV) color camera is used as the light sensor to capture POV color images and runs through a machine learning (ML) model to detect light sources and their intensity.

In some implementations, the light source 591 is imaged by the light sensor and thus the attributes of the light source 591 may be directly measured by ambient light condition measurement (e.g. an image captured by a CMOS camera). In other implementations, light source 591 is not directly captured in the ambient light condition measurement and the attributes of the light source 591 are derived from the light from the light source 591 that illuminates scene 202. For example, a location and/or intensity of the light source may 591 be derived from image processing analysis of real-world shadows captured in an image captured by the light sensor. In some implementation, machine learning (ML) or Artificial Intelligence (AI) algorithms identify the attributes of the light source 591.

To generate a dimming map, a rasterization method and/or a ray tracing method may be utilized. In the rasterization method, a shadow map is rendered from the light source 591. When the actual rendering occurs, the pixels (converted to the light source depth) in real objects are checked to see if the pixel is occluded. A global ambient light value and/or a light source intensity may be used to adjust a darkness value of a pixel. The darkness values may then be written to a dimming map buffer for being driven onto the dimming optical element.

Figure 6:
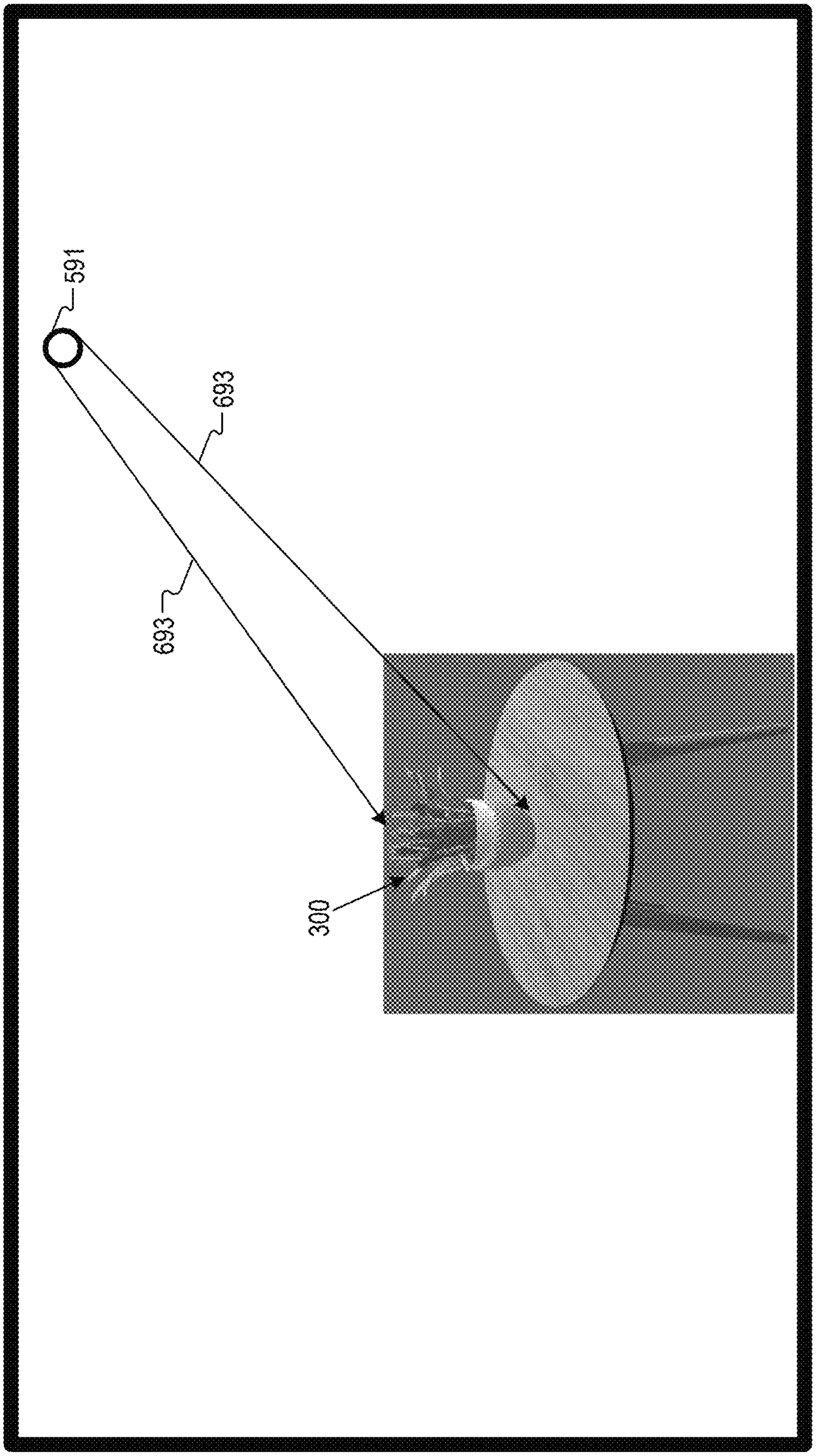
FIG. 6 illustrates rays cast from a light source onto a virtual object resting on a real-world object, in accordance with aspects of the disclosure.

FIG. 6 illustrates rays 693 cast from light source 591 onto virtual object 300 resting on the real-world object (table 233). In a ray tracing method of rendering a dimming map, rays 693 are cast from lighting source 591. If a pixel that should receive one of the rays 693 is occluded by virtual object 300 according to a depth map, that pixel is assigned a dimming value. Collectively, the pixels that are given dimming values are the dimming map that can be driven onto the dimming optical element.

In an implementation, the rasterization method is utilized for occlusion depth generation and the ray tracing method is utilized for generating the dimming map. In this way, the rendering of the dimming map may be accomplished in one pass, which will save on power consumption.

Figure 7:
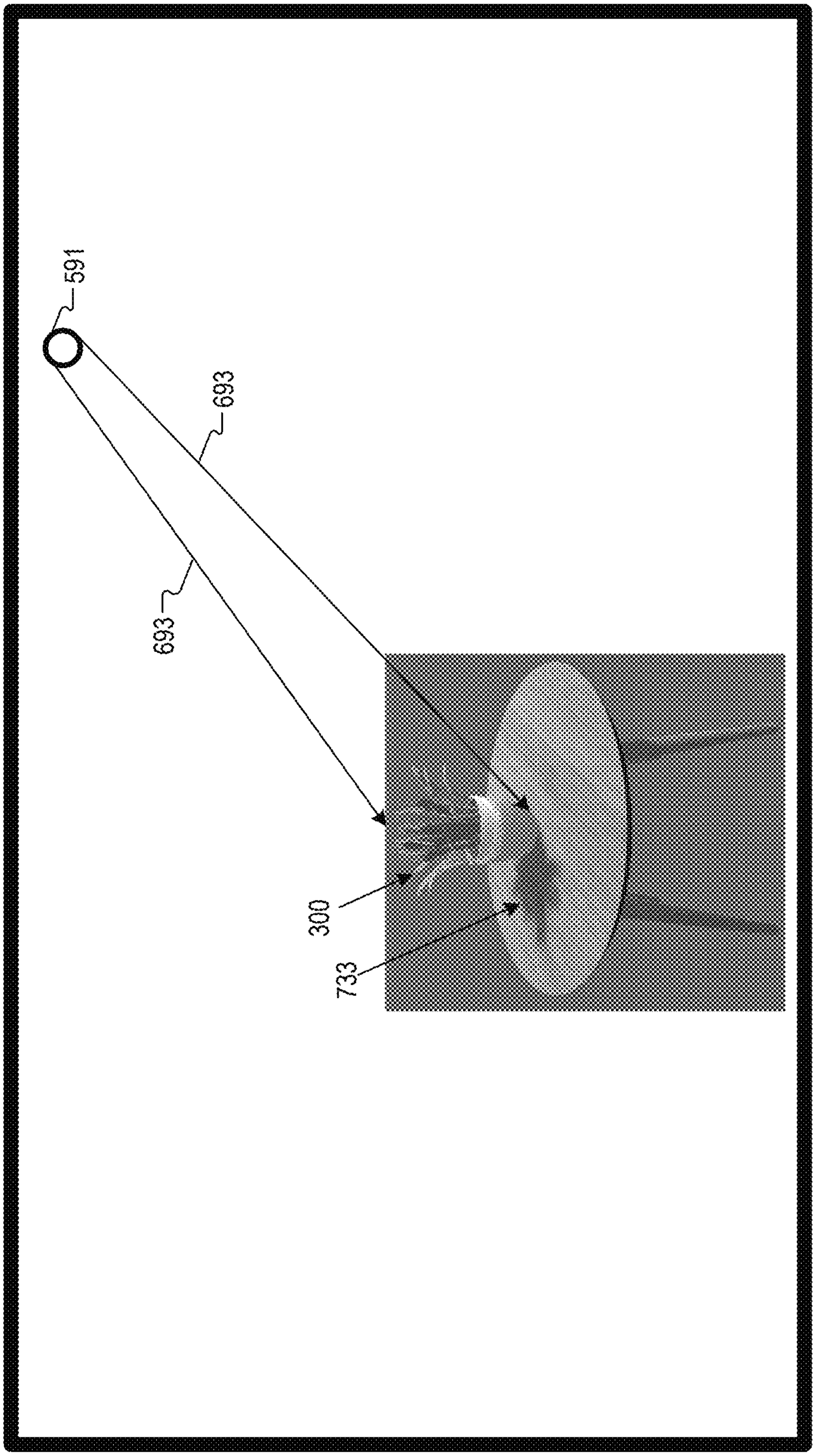
FIG. 7 illustrates a virtual shadow of a virtual object that is cast on a real-world object by driving the dimming map onto the dimming optical element, in accordance with aspects of the disclosure.

FIG. 7 illustrates the virtual shadow 733 of virtual object 300 that is cast on the real-world object (table 233) by driving the dimming map onto the dimming optical element, in accordance with implementations of the disclosure.

Figure 8B:
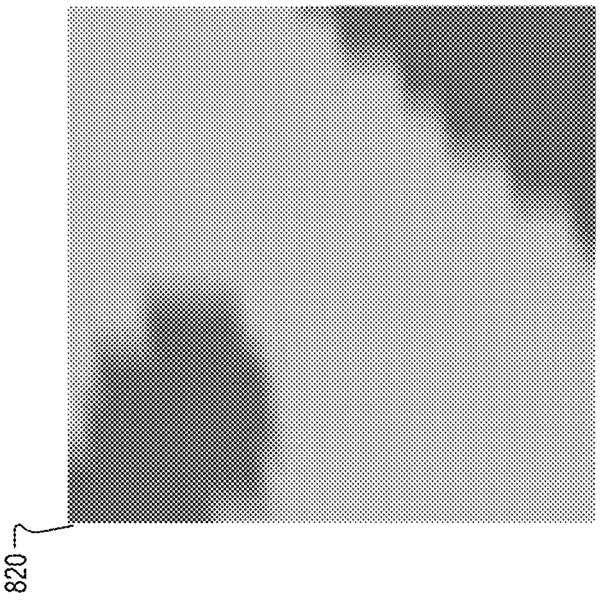
FIGS. 8A and 8B illustrate zoomed-in views of an inverted dimming map that includes a virtual shadow, in accordance with aspects of the disclosure.
Figure 8A:
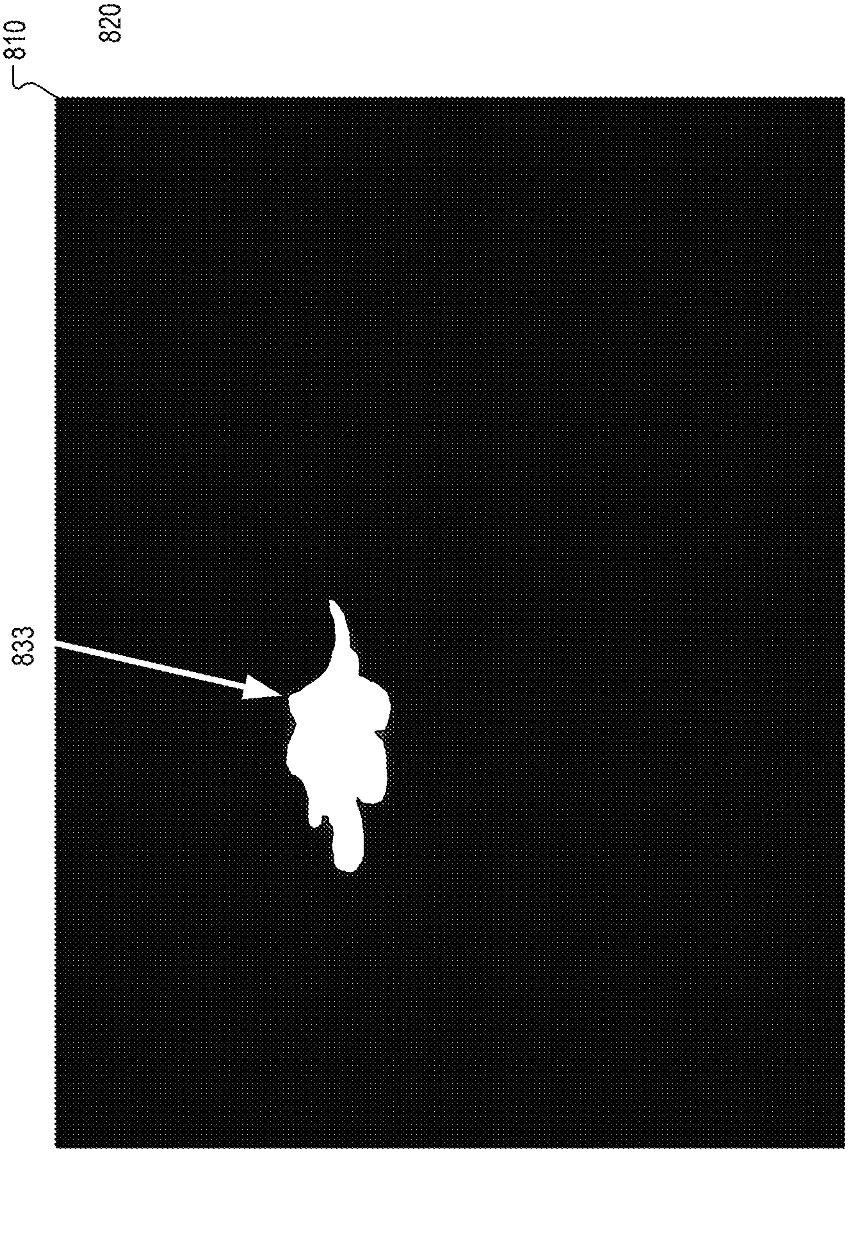

FIG. 8A illustrates a zoomed-in view of an inverted dimming map 810 that includes virtual shadow 833, in accordance with aspects of the disclosure. FIG. 8B illustrates that a further zoomed-in view of dimming map 810 may have noticeably sharp edges or jagged edges.

Figure 9B:
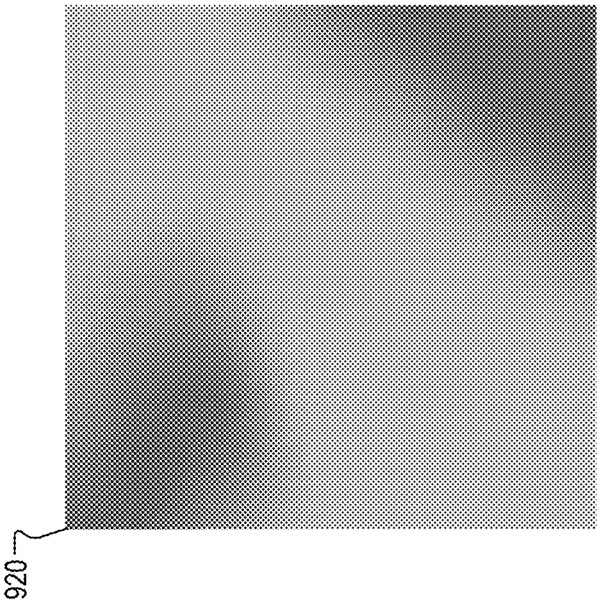
FIGS. 9A and 9B illustrate zoomed-in views of a blurred dimming map generated from applying a blur filter to the inverted dimming map of FIGS. 8A and 8B, in accordance with aspects of the disclosure.
Figure 9A:
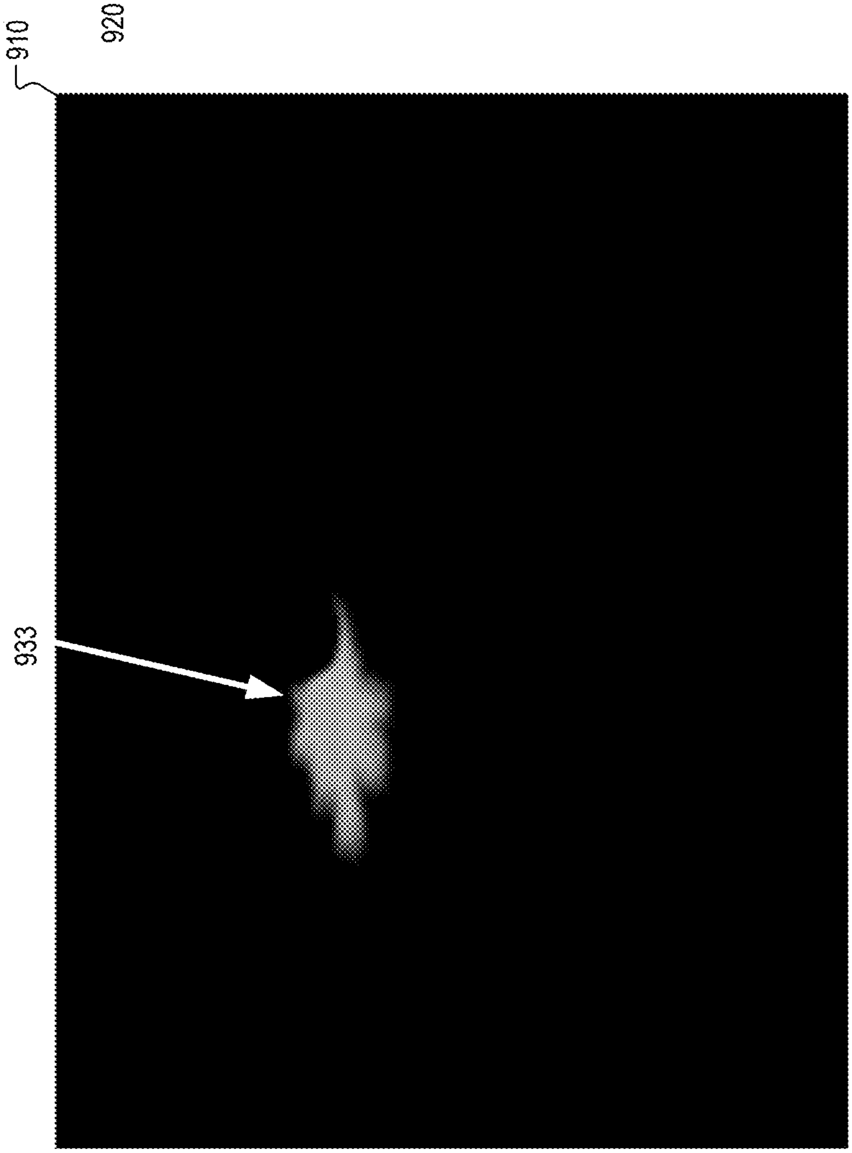

FIG. 9A illustrates a zoomed-in view of a blurred dimming map 910 generated from applying a blur filter to dimming map 810 to smooth the edges of virtual shadow 833 into smoothed virtual shadow 933. FIG. 9B illustrates that a further zoomed-in view of blurred dimming map 910 has smoother or softer lines that the zoomed-in view of dimming map 810 of FIG. 8B. Smoothing or softening the edges of the virtual shadow in the dimming map may give the virtual shadow a more realistic appearance.

Figure 10:
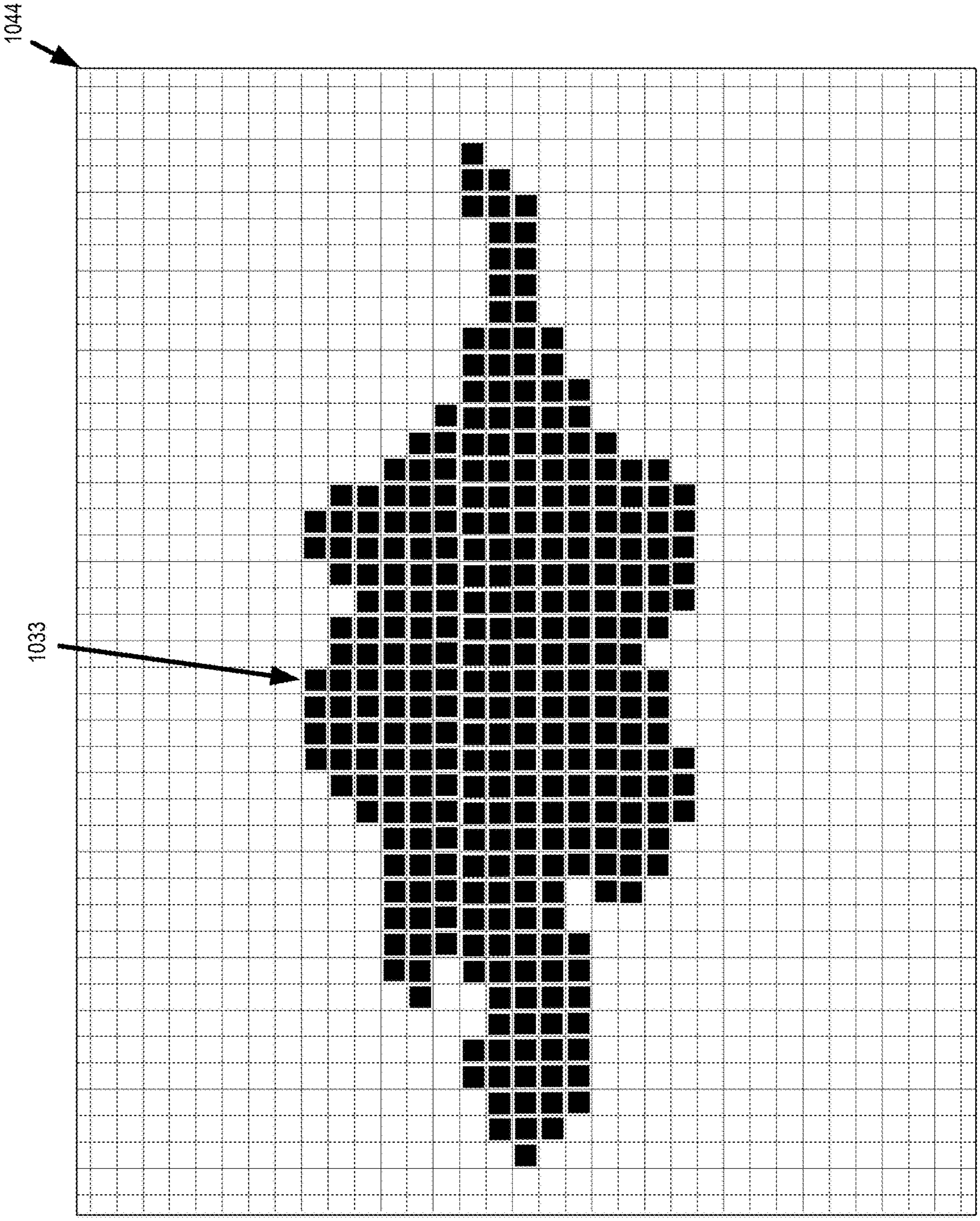
FIG. 10 illustrates a zoomed-in view of a dimming map driven onto dimming pixels, in accordance with aspects of the disclosure.

FIG. 10 illustrates a zoomed-in view of a dimming map 1033 driven onto dimming pixels 1044. In FIG. 10, the dimming values driven onto the dimming pixels are digital (fully dim or fully bright). The fully dim dimming values block a very high percentage of scene light 191 from propagating to the eye for the pixels in the dimming pixels that are driven to the fully dim dimming value. The fully bright dimming values transmit a very high percentage of scene light 191 propagating to the eye for the pixels in the dimming pixels that are driven to the fully bright dimming value.

Figure 11:
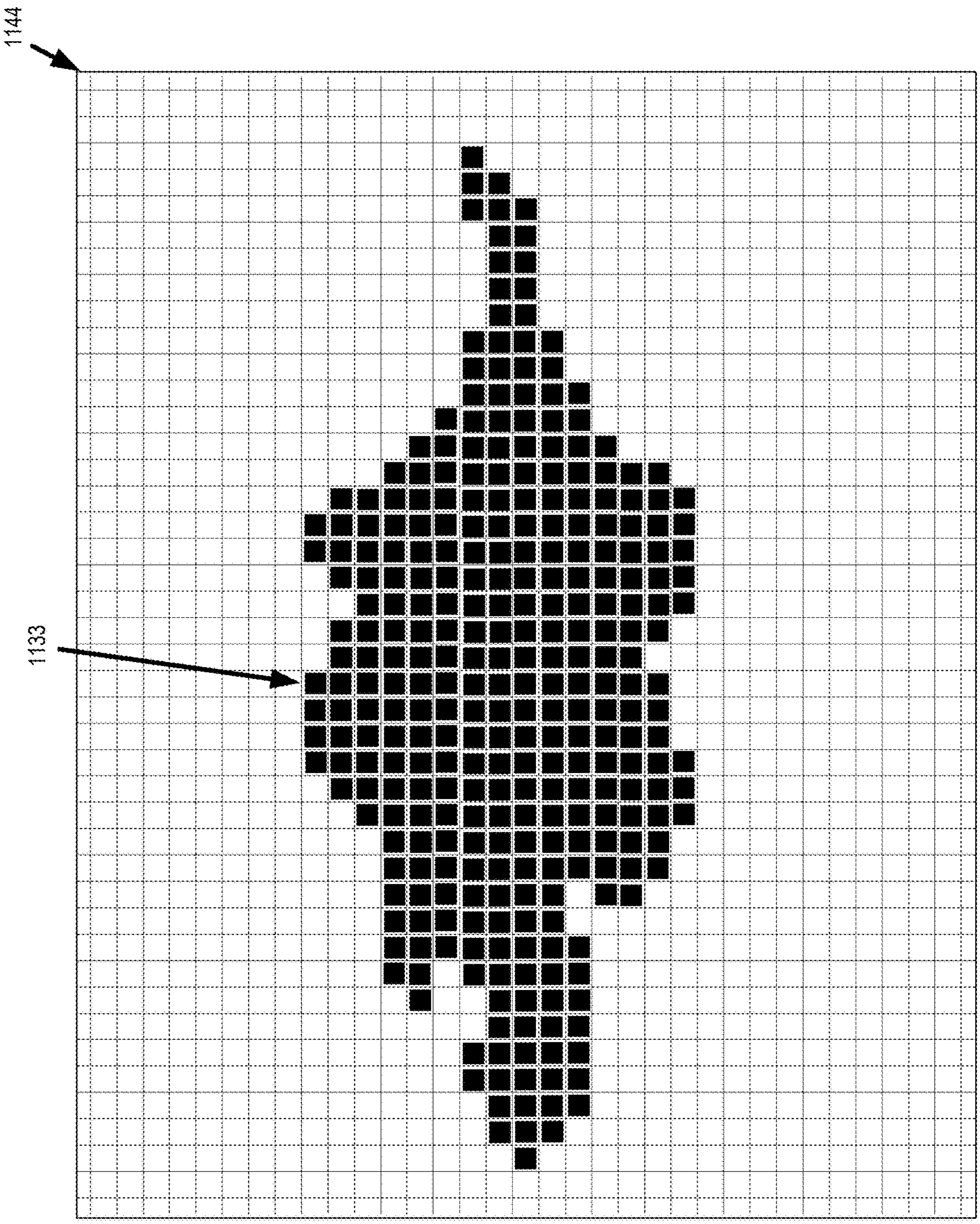
FIG. 11 illustrates a zoomed-in view of a dimming map having varying dimming values driven onto dimming pixels, in accordance with aspects of the disclosure.

FIG. 11 illustrates a zoomed-in view of a dimming map 1133 driven onto dimming pixels 1144. In FIG. 11, the dimming values driven onto the dimming pixels 1144 may have more granular modulation than the on/off digital dimming pixels 1044. FIG. 11 shows the dimming map 1133 includes a varying range of dimming values driven onto dimming pixels 1144. For example, the dimming pixels may be driven to dimming values that translate to transmission of: approaching 0% of scene light (darkest possible), 10% of scene light, 20% of scene light, 30% of scene light, 40% of scene light, 50% of scene light, 60% of scene light, 70% of scene light, 80% of scene light, 90% of scene light, and approaching 100% of scene light (or as transmissive as possible). Having greater design freedom to modulate the dimming values of dimming pixels 1144 may provide a more realistic appearance to the virtual shadow generated by driving dimming map 1133 onto dimming pixels 1144. In addition to the outside edges of the dimming map 1133 having varying dimming values, the inside of dimming map 1133 also has varying dimming values since light from light source 591 may propagate through the leaves or branches of the virtual plant 300.

Figure 12:
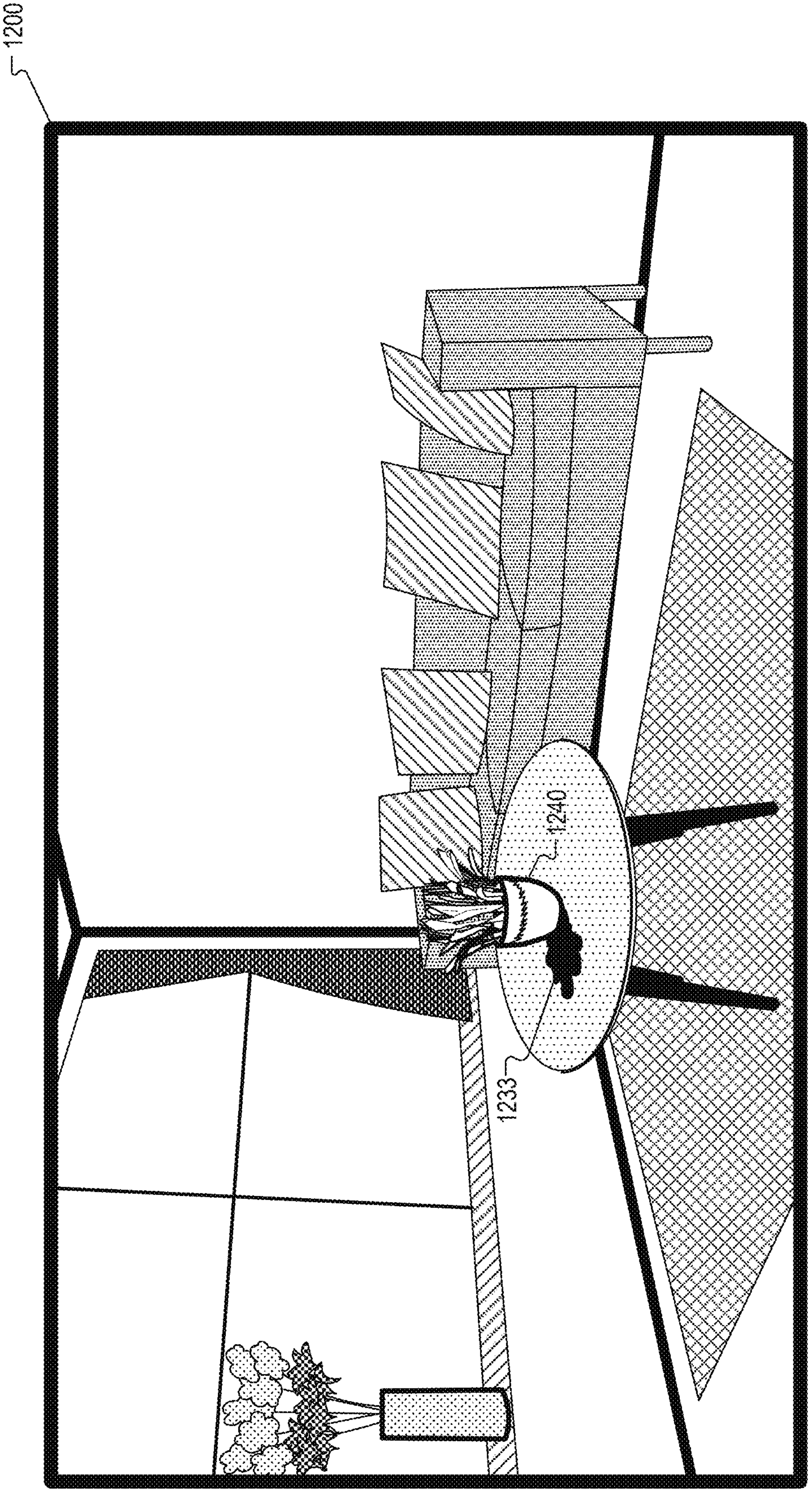
FIG. 12 illustrates a scene from the point of view of a wearer of an HMD, in accordance with aspects of the disclosure.

FIG. 12 illustrates a scene 1200 from the point of view of a user/wearer of an HMD. Scene 1200 includes real-world objects (e.g. couch, table, vase) from scene light, a virtual object 1240 (plant) from display light from the display of the HMD, and virtual shadow 1233 of the virtual object generated by dimming pixels of the dimming optical element selectively blocking scene light.

Figure 13:
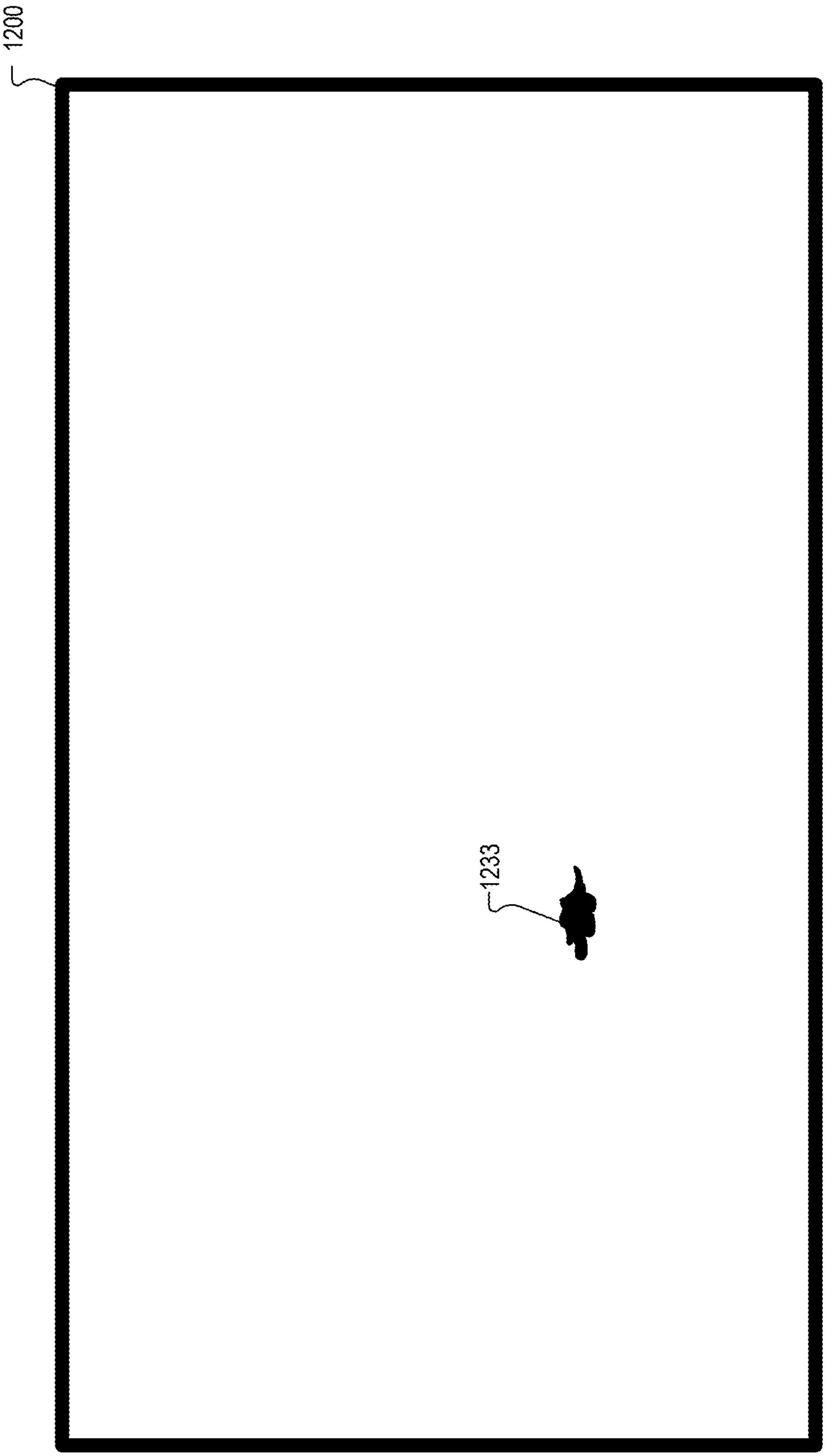
FIG. 13 illustrates a virtual shadow generated by the dimming pixels of the dimming optical element selectively blocking scene light, in accordance with aspects of the disclosure.
Figure 14:
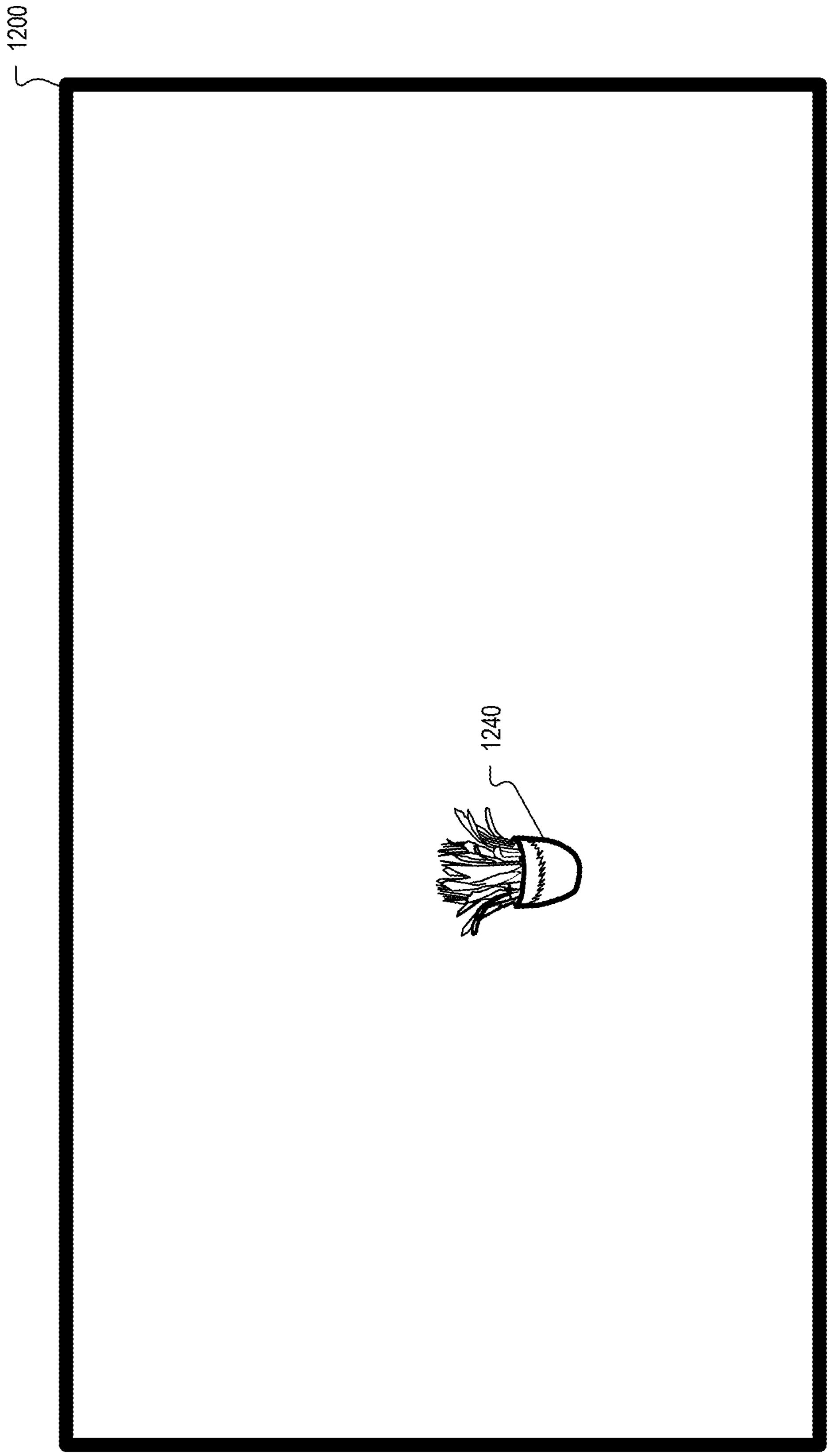
FIG. 14 illustrates a virtual object generated by image light from the display of an HMD, in accordance with aspects of the disclosure.

FIG. 13 illustrates just the virtual shadow 1233 generated by the dimming pixels of the dimming optical element selectively blocking scene light and FIG. 14 illustrates just the virtual object 1240 generated by image light from the display of the HMD.

Returning again to FIG. 15, in some implementations of process 1500, generating the dimming map includes applying a blur filter to edges of the virtual shadow to smooth the edges of the virtual shadow.

In some implementations of process 1500, generating the dimming map includes generating different dimming values within the virtual shadow. The different dimming values may be based at least in part on an intensity of a light source and the intensity of the light source may be detected in the ambient light condition received from the light sensor.

In some implementations of process 1500, generating the dimming map includes adjusting a dimming value of a dimming pixel in the dimming optical element when the dimming pixel is occluded by the virtual object with respect to a light source detected in the ambient light condition.

Figure 16:
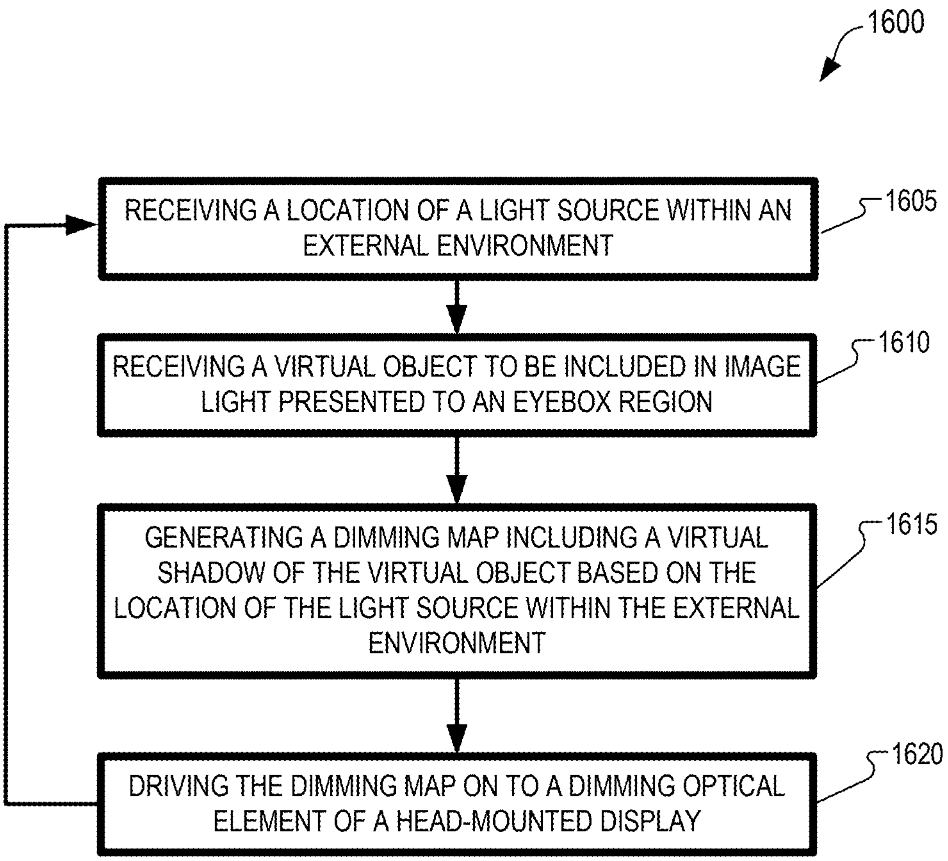
FIG. 16 illustrates an example flow chart of a process for virtual shadow casting, in accordance with aspects of the disclosure.

FIG. 16 illustrates an example flow chart of a process 1600 for virtual shadow casting, in accordance with aspects of the disclosure. The order in which some or all of the process blocks appear in process 1600 should not be deemed limiting. Rather, one of ordinary skill in the art having the benefit of the present disclosure will understand that some of the process blocks may be executed in a variety of orders not illustrated, or even in parallel. In some implementations of process 1600, processing logic 170 may perform all or a portion of the process blocks included in process 1600.

In process block 1605, a location of a light source (e.g. light source 591) in an external environment is received (e.g. scene 202).

In process block 1610, a virtual object (e.g. plant 300) to be included in image light presented to an eyebox region is received.

In process block 1615, a dimming map including a virtual shadow of the virtual object is generated based on the location of the light source within the external environment. In some implementations, the virtual shadow of the virtual object is to be cast on a real-world object in the external environment.

In process block 1620, the dimming map is driven onto a dimming optical element (e.g. dimming optical element 140A) of an HMD to present the virtual shadow of the virtual object onto the real-world object.

In some implementations, process 1600 returns to process block 1605 after executing process block 1620.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The term "processing logic" (e.g. processing logic 170) in this disclosure may include one or more processors, microprocessors, multi-core processors, Application-specific integrated circuits (ASIC), and/or Field Programmable Gate Arrays (FPGAs) to execute operations disclosed herein. In some embodiments, memories (not illustrated) are integrated into the processing logic to store instructions to execute operations and/or store data. Processing logic may also include analog or digital circuitry to perform the operations in accordance with embodiments of the disclosure.

A "memory" or "memories" (e.g. memory 175) described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

Network 180 may include any network or network system such as, but not limited to, the following: a peer-to-peer network; a Local Area Network (LAN); a Wide Area Network (WAN); a public network, such as the Internet; a private network; a cellular network; a wireless network; a wired network; a wireless and wired combination network; and a satellite network.

Communication channels may include or be routed through one or more wired or wireless communication utilizing IEEE 802.11 protocols, short-range wireless protocols, SPI (Serial Peripheral Interface), $I^2C$ (Inter-Integrated Circuit), USB (Universal Serial Port), CAN (Controller Area Network), cellular data protocols (e.g. 3G, 4G, LTE, 5G), optical communication networks, Internet Service Providers (ISPs), a peer-to-peer network, a Local Area Network (LAN), a Wide Area Network (WAN), a public network (e.g. "the Internet"), a private network, a satellite network, or otherwise.

A computing device may include a desktop computer, a laptop computer, a tablet, a phablet, a smartphone, a feature phone, a server computer, or otherwise. A server computer may be located remotely in a data center or be stored locally.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A computer-implemented method comprising:

identifying a real-world object in an external environment by:

building a scene mesh including a plurality of objects of the external environment; and selecting the real-world object from the plurality of objects based on a location of the real-world object with respect to a virtual object;

detecting, with a light sensor, an ambient light condition of the external environment;

generating a dimming map including a virtual shadow based on the ambient light condition, the virtual shadow of the virtual object to be cast on the real-world object; and driving the dimming map onto a dimming optical element of a head-mounted display to present the virtual shadow of the virtual object onto the real-world object.

2. The computer-implemented method of claim 1 further comprising:

driving the virtual object onto a display of the head-mounted display contemporaneously with driving the dimming map onto the dimming optical element.

3. The computer-implemented method of claim 1, wherein generating the dimming map includes applying a blur filter to edges of the virtual shadow to smooth the edges of the virtual shadow.

4. The computer-implemented method of claim 1, wherein generating the dimming map includes generating different dimming values within the virtual shadow, the different dimming values based at least in part on an intensity of a light source, the intensity of the light source being detected in the ambient light condition.

5. The computer-implemented method of claim 1, wherein generating the dimming map includes adjusting a dimming value of a dimming pixel in the dimming optical element when the dimming pixel is occluded by the virtual object with respect to a light source detected in the ambient light condition.

6. The computer-implemented method of claim 1, wherein the dimming optical element includes an array of dimming pixels that modulate an intensity of scene light from the external environment propagating through the dimming optical element.

7. The computer-implemented method of claim 1, wherein detecting the ambient light condition includes detecting one or more light sources in the external environment and a location of the one or more light sources.

8. The computer-implemented method of claim 7, wherein detecting the ambient light condition includes detecting a color of the one or more light source and an intensity of the one or more light sources.

9. The computer-implemented method of claim 1, wherein detecting the ambient light condition includes receiving ambient light sensor data, simultaneous localization and mapping (SLAM) images, or color images from a Point-of-View (POV) camera of the head-mounted display.

10. A head-mounted display (HMD) comprising:

a display to provide image light to an eyebox region;

a lens including a dimming optical element including an array of dimming pixels configured to selectively modulate an intensity of scene light propagating to the eyebox region;

a light sensor configured to detect an ambient light condition of an external environment of the HMD; and processing logic configured to:

identify a real-world object in the external environment by:

building a scene mesh including a plurality of objects of the external environment; and selecting the real-world object from the plurality of objects based on a location of the real-world object with respect to a virtual object;

generate a dimming map including a virtual shadow based on the ambient light condition, the virtual shadow of the virtual object for casting on the real-world object; and drive the virtual object on the display contemporaneously with driving the dimming map onto the dimming optical element to present the virtual shadow of the virtual object on the real-world object.

11. The HMD of claim 10, wherein generating the dimming map includes applying a blur filter to edges of the virtual shadow to smooth the edges of the virtual shadow.

12. The HMD of claim 10, wherein generating the dimming map includes generating different dimming values within the virtual shadow, the different dimming values based at least in part on an intensity of a light source.

13. The HMD of claim 10, wherein generating the dimming map includes adjusting dimming values of the dimming pixels in the array when the dimming pixels are occluded by the virtual object with respect to a light source.

14. The HMD of claim 10, wherein detecting the ambient light condition includes detecting one or more light sources in the external environment and a location of the one or more light sources.

15. The HMD of claim 14, wherein detecting the ambient light condition includes detecting a color of the one or more light source and an intensity of the one or more light sources.

16. The HMD of claim 10, wherein the lens further includes a waveguide configured to direct the image light to the eyebox region, and wherein the display provides the image light to the waveguide.

17. The HMD of claim 10, wherein the light sensor includes at least one of, an ambient light sensor, a simultaneous localization and mapping (SLAM) camera, or a complementary metal-oxide semiconductor CMOS image sensor of the head-mounted display.

18. A computer-implemented method comprising:

receiving a location of a light source within an external environment;

receiving a virtual object to be included in image light presented to an eyebox region;

generating a dimming map including a virtual shadow of the virtual object based on the location of the light source within the external environment, wherein the virtual shadow of the virtual object is to be cast on a real-world object in the external environment, wherein the real-world object is selected by:

building a scene mesh including a plurality of objects of the external environment; and selecting the real-world object from the plurality of objects based on a location of the real-world object with respect to the virtual object; and driving the dimming map onto a dimming optical element of a head-mounted display to present the virtual shadow of the virtual object onto the real-world object.

* * * * *